United States Patent [19]
Heinke et al.

[11] Patent Number: 5,334,301
[45] Date of Patent: Aug. 2, 1994

[54] ELECTROCHEMICAL CELL HAVING INFLATABLE SEALS BETWEEN ELECTRODES

[75] Inventors: Harri Heinke, Erlensee; Wolfgang Blatt, Wächtersbach; Bernd Busse, Darmstadt, all of Fed. Rep. of Germany

[73] Assignee: Heraeus Elektrochemie GmbH, Hanau, Fed. Rep. of Germany

[21] Appl. No.: 15,692

[22] Filed: Feb. 9, 1993

[30] Foreign Application Priority Data

Mar. 4, 1992 [DE] Fed. Rep. of Germany ....... 4206843

[51] Int. Cl.⁵ ............................................. C25B 9/00
[52] U.S. Cl. .................... 204/267; 204/270; 204/279; 204/268; 204/269
[58] Field of Search .............. 204/279, 254–258, 204/267, 268–270, 277

[56] References Cited

U.S. PATENT DOCUMENTS

| | | | |
|---|---|---|---|
| 3,468,787 | 9/1969 | Westerlund | 204/270 X |
| 3,620,954 | 2/1971 | Ziegler et al. | 204/206 |
| 4,069,129 | 1/1978 | Sato et al. | 204/258 |
| 4,122,242 | 10/1978 | Feldhake | 429/174 |
| 4,207,165 | 6/1980 | Mose et al. | 204/258 |
| 4,432,858 | 2/1984 | Schmitt et al. | 204/257 |
| 4,605,483 | 8/1986 | Michaelson | 204/277 |
| 4,846,952 | 7/1989 | Gardner et al. | 204/279 |
| 4,898,653 | 2/1990 | Morris | 204/279 X |

FOREIGN PATENT DOCUMENTS

| | | |
|---|---|---|
| 397684 | 8/1924 | Fed. Rep. of Germany . |
| 3705296 | 7/1993 | Fed. Rep. of Germany . |
| 141463 | 1/1979 | German Democratic Rep. . |

*Primary Examiner*—Donald R. Valentine
*Attorney, Agent, or Firm*—Felfe & Lynch

[57] ABSTRACT

An electro-chemical cell suitable for chromic acid regeneration or the electro-chemical treatment of methane sulphonic acid has several plate shaped bipolar electrodes which are spaced by means of frames to form an electrolyte space between every two adjacent electrodes. The electrolyte spaces are closed at the sides and at the bottom so they are impermeable to liquids and adjacent bipolar electrodes are electrically insulated against each other. The electrodes are tightly secured against the frame by means of hose-shaped sealing elements that can expand if internal pressure is applied, these sealing elements each being located in a fixed position in a U-shaped groove inside the frames. The cell is not sealed at the liquid surface of the electrolyte, however, it can be equipped with a cover, depending on the application. In order to remove an electrode, the sealing pressure is decreased by means of a pressure reduction in the interior of the sealing elements.

18 Claims, 3 Drawing Sheets

ELECTROCHEMICAL CELL HAVING INFLATABLE SEALS BETWEEN ELECTRODES

BACKGROUND OF THE INVENTION

The invention relates to an electro-chemical cell used for the completion of electro-chemical processes by means of ion-conducting solutions with several essentially plate-shaped electrodes which are spaced apart from each other by frames and which form an electrolyte space between two adjacent electrodes. The electrolyte spaces are sealed at least in the area on the side and at the bottom so they are impermeable to liquids and adjacent electrodes are electrically insulated against each other. The electrodes and the frame are tightened against each other, but can be loosened.

DD-PS 141 463 describes a device for the completion of electro-chemical processes having one electrolysis cell with electrode channels having a parallel flow, designed in accordance with the filter press principle. The electrodes which are separated from each other by means of membranes or diaphragms are sealed against each other by means of sealing frames, these sealing frames consisting of a suitable flexible material, such as PVC, and they are sealed during the assembly of the filter press arrangement. Apart from monopolar electrodes, bipolar electrodes are also provided for example for the regeneration of chromic acid. In the case of such a filter press arrangement, the exchange of individual electrodes poses a problem since the entire mechanism must be closed down and dismantled to facilitate cleaning or to exchange individual electrodes and/or bipolar electrodes.

SUMMARY OF THE INVENTION

The electrodes are arranged in a similar manner with the filter press principle, but are not held together by pressure that is applied on all cells at the same time. Instead they can be quickly exchanged due to individual sealing measures while the remaining electrodes remain in operation; monopolar as well as bipolar electrodes are to be used. The electrolyte space is supposed to be easily accessible.

This task is solved by positioning a hose-like tubular sealing element with an expandable cross section in a fixed location between at least one sealing surface of an electrode frame and the sealing surface of the electrode. Tightening is achieved by applying pressure to expand the cross section of the sealing element.

An essential advantage can be seen in the fact that the cell system is open at the top so that due to a drop in pressure of the sealing element, the adjacent electrode and/or bipolar electrode can easily be taken out at any time and/or cleaned while the operation of the remaining cells continues, subject to a slight correction of the cell voltage if necessary.

In an advantageous variation of the invention, each electrode frame is equipped with a hose-like tubular sealing element at least on one side. The sealing elements are each fixed in a U-shaped groove in the electrode frame.

This arrangement has the advantage that removal of an electrode is possible without having to take out the sealing element, which remains in the frame. However, the sealing element itself can easily be taken out of the groove in the event of damage due to corrosion for instance, and it can be exchanged for a new sealing element.

In a further variation, the sealing element is paralleled by a further sealing element, also in a U-shaped groove in the gap between two electrode frames. Such an arrangement has the advantage that a large number of individual electrode frames can be pressed together to form a sealed, block-shaped casing which results in a simple arrangement of the electrode frames that is similar to the filter press principle. An advantage is also that a trough that holds the electrodes and the electrode frames is not necessary.

The fact that the system can be used for oxidative and reductive electro-chemical processes with bipolar electrodes is advantageous because any electrolytic short circuiting between the cells can definitely be prevented due to the design that is open at the top by means of an overflow-droplet-segment. A further advantage lies the fact that the sealing elements can also be used for sealing the ion exchanger membranes or diaphragms if such a cell separation is required based on use.

BRIEF DESCRIPTION OF THE DRAWING

FIG. 2b is a detailed partial plan view A in accordance with FIG. 2a;

DETAILED DESCRIPTION OF THE PREFERRED EMBODIMENT

Figure 1:
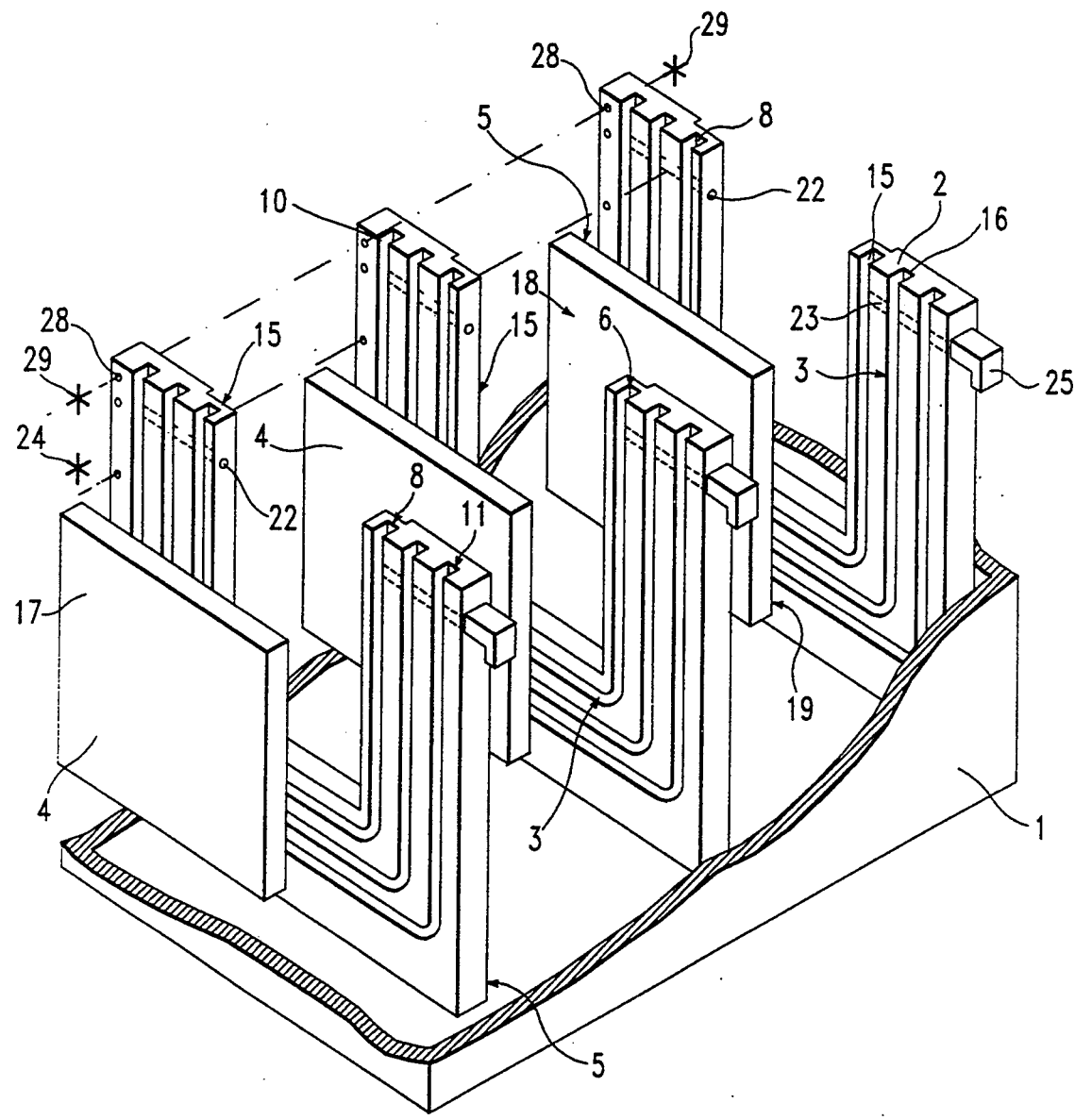
FIG. 1 is a cutaway exploded perspective view showing the cell housing located in a trough with the corresponding electrodes and electrode frames prior to assembly.

In accordance with FIG. 1, a large number of electrode frames 2 are located in cell trough 1, which serves as a collection basin. Bipolar electrodes 4 are located between these electrode frames which connect impermeably at the sealing surface 3 of electrode frames 2 when pressed together. The sealing surfaces 3 have a U-shaped groove 8 in which a hose-like tubular sealing element 6 is at least partially inserted, the exact positioning of each electrode 4 being fixed in each case by a U-shaped recess 15 on that side of the electrode frame that is located on the side opposite groove 8. The sealing surfaces 3 at the electrode frames 2 are also surrounded by grooves 11 in a U-shaped arrangement in which the sealing elements 10 are located which seal the space between each adjacent electrode frame 2. Between the two U-shaped grooves 8, 11 there is another groove 16 with U-shaped design which is located in the area of sealing surface 3 of the electrode frame 2 and which is designed as a control groove in order to verify the impermeability in the area of the sealing surface, and if necessary to draw attention by means of a sensor to an originating leak by triggering an alarm if there is contact with a liquid.

Figure 2A:
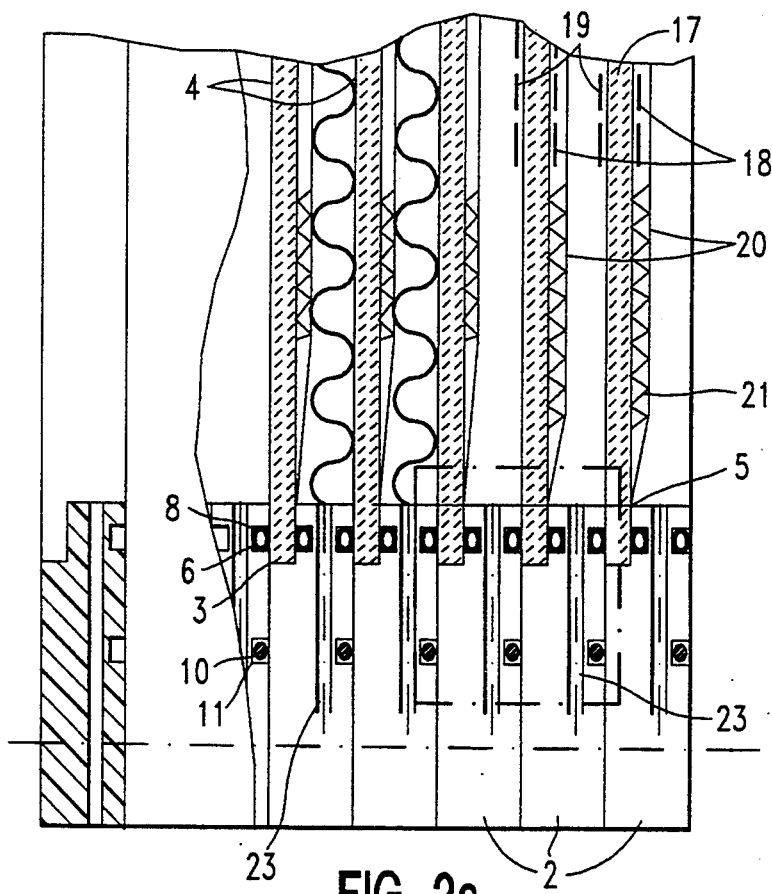
FIG. 2a is a cutaway partial plan view showing the cell with the inserted electrodes that are insulated against the frames.

Referring to FIG. 2a, electrode 4 is a bipolar electrode consisting of a solution-resistant electrically conductive plate-shaped middle piece 17 made from oxide ceramics which is coated on the anodic side 19 and the cathodic side 18 with an electrically conductive coating for the electro-chemical reaction.

A bipolar electrode 4 on a titanium oxide basis with an electro-catalytic coating has a thickness of 3 mm and plate edges each about 250 mm long. On the anodic side 19 as well as on the cathodic side 18, the middle part is coated with platinum. A solution-resistant spacer 21 is provided on the cathodic side which maintains a distance of about 3 mm between the cathodic side 18 and a separating device 20 covering the cathodic side either as an ion exchanger membrane (e.g. for chromic acid regeneration) or as a diaphragm (e.g. for the electrochemical treatment of methane sulphonic acid). The maximum acceptable current density on the electrode surface is in the neighborhood of 0.1 to 4 $KA/m^2$. Electrode 4 is also designed to be a sealing surface 5 in the border area to be applied on the sealing surface 3 of the electrode frame 2. In this area, the separating device 20 is lying directly on top of the cathodic side 18 without a spacer. The anodic side 19 is designed to be free-lying and does not have any membranes or diaphragms.

When operating the cell, the liquid level of the solution (which has not been illustrated here) is determined by the outlet openings 22 in accordance with FIG. 1 in the upper area of the U-shaped recess 15 of the electrode frame 2. A descending gradient 23 inside the electrode frame 2 connects each outflow opening 22 to an outlet opening 24. A pipe 25 is connected to this opening to carry away the emerging solution into cell trough 1. Here it is possible either to provide such a run-off on both sides of the U-shaped electrode frame, or to only provide run-off openings on one side of the electrode frame. Here it is essential that there be a descending gradient between every outflow opening 22 and the corresponding outlet opening 24 and that no ion-conducting short-circuit bridges can exist between two adjacent electrodes. In practice, we are dealing with a removal of the electrolyte and/or the anolyte solution in individual droplets.

To build the entire cell, the elements of the cell shown exploded in FIG. 1 are pressed together by means of the screw bolts 29 (symbolically illustrated) that are installed in the electrode frame by means of openings 28. The electrodes 4 are each pressed with their anodic coating side 19 against the sealing elements 6 and with their cathodic side 18 into the U-shaped recesses 15 of the electrode frame 2. The actual sealing surface is thereby formed between the sealing surfaces 3 of the electrode frames and the sealing surfaces 5 by screwing in bolt 29 and by applying pressure to the sealing elements 6. The pressure can be applied by means of an air compressor to the sealing elements 6, which are closed at one end. For the removal of individual electrodes 4 it is only necessary to release the excess pressure from the corresponding sealing element 6 whereby electrode 4 can subsequently be pulled out easily by simple lifting as a result of the now non-existing tension. In this manner it is possible to take out and clean individual electrodes or to exchange whole electrode groups even while the cells are in operation.

Figure 2B:
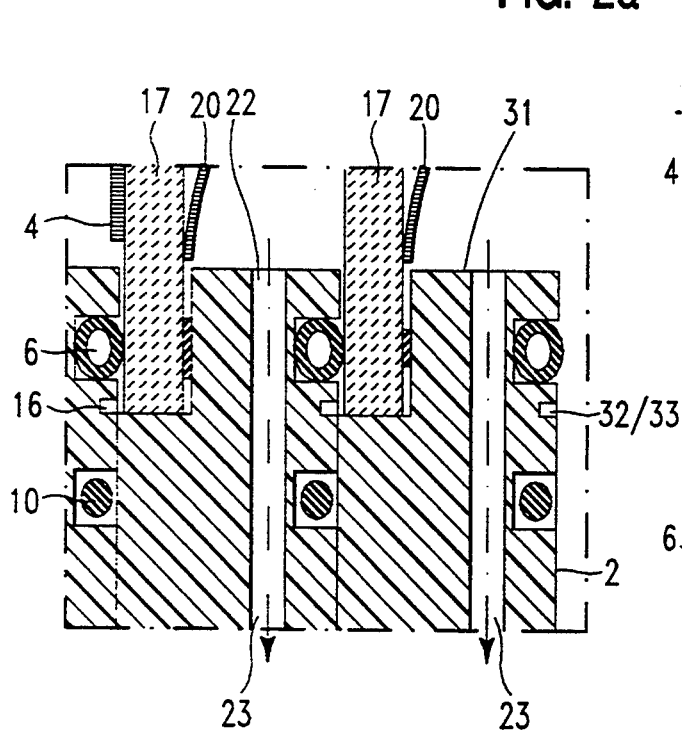
Figure 2C:
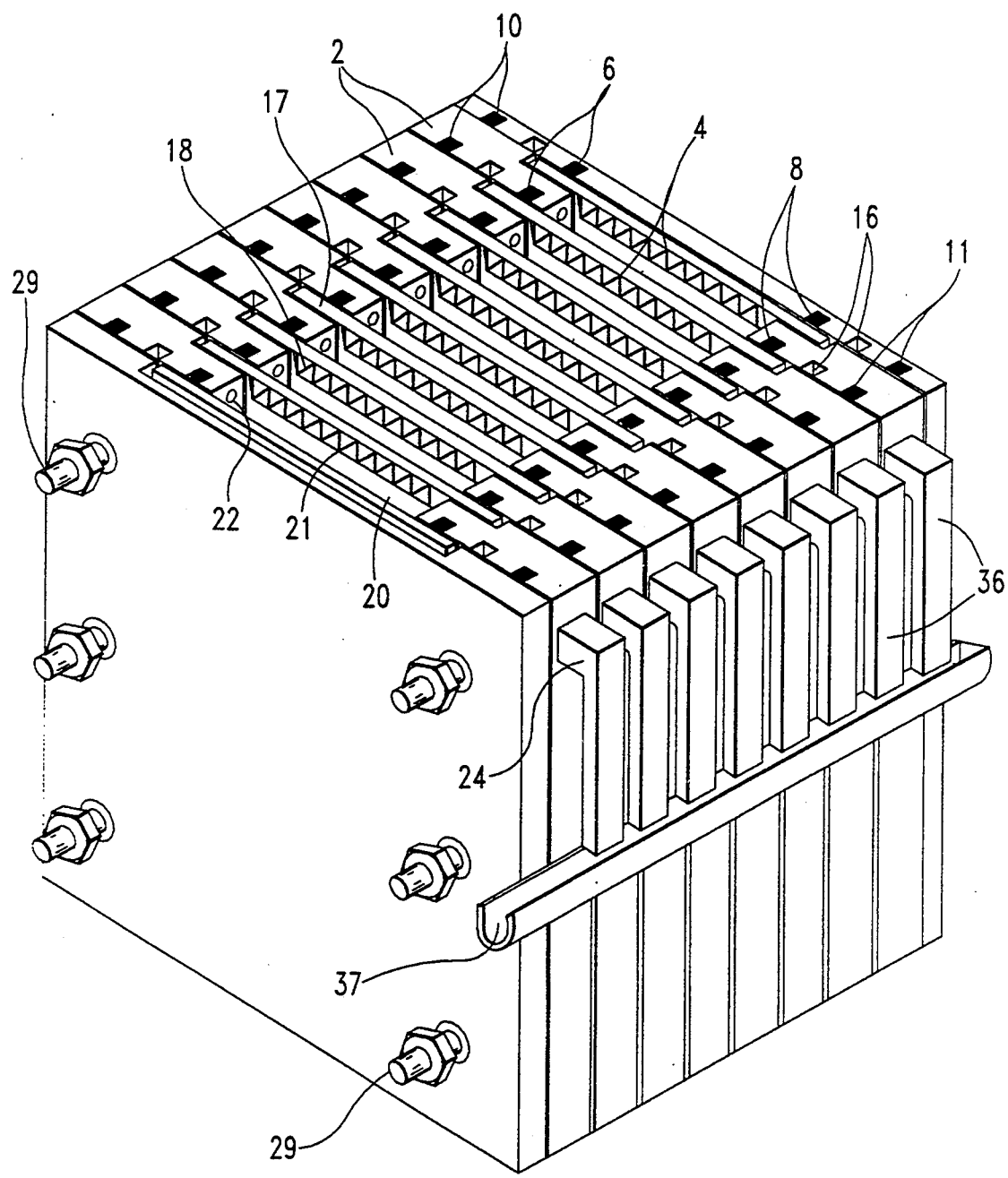
FIG. 2c is a schematic perspective showing a cell consisting of several electrodes and electrode frames.

FIG. 2a shows a top view of a section from the assembled cell arrangement, with the trough left out as is also possible in practice. The electrodes 4 shown in this view are tightly secured in the electrode frame 2 with the sealing elements 6 expanded due to applied pressure and thereby sealing the area between the groove 8 of the electrode frame 2 and the U-shaped border surface of the anodic coating side 19 so it is impermeable to gases and liquids. On the cathodic coating side 18, the zig-zag shaped spacer 21 is shown which supports the separating device 20 opposite the cathodic side 18 and therefore forms a catholyte space. The area located between anodic coating 19 and membrane 20 forms the anolyte space. The electrode frames 2 are all pressed together tightly and sealed against each other by means of the second sealing elements 10 which are located in the second U-shaped groove 11. Only the top area of the cells is open so that access to the surface of the liquid is possible at any time. As additional sealing measures, the surfaces 18 of electrodes 4 facing the cathode are supported in the U-shaped recess 15 of electrode frame 2 in such a way that they are pressed against an additional, also surrounding seal 31 which, however, is of less significance since impermeability is already ensured by sealing element 6. Furthermore, FIG. 2b shows the third groove 16 which serves as a control groove in which a sensor 32 is located which sends an error signal by means of an alarm 33 if there is contact with an ion-conducting liquid in order to draw the operator's attention to the possibility of an electrolyte or solution leak. Due to the sealing surfaces being in a U-shape, it is also possible to operate the cells without a cell trough, as illustrated in FIG. 2c. In this context, the cell trough, as it is known from FIG. 1, only has a safety function against electrolyte leaks resulting from errors as well as the function of a collection basin for the electrolyte overflow.

Furthermore, FIG. 2a schematically illustrates in a broken-up view outflow opening 22, descending gradient 23 and outlet opening 24 which determine the height of the solution level in the cell, i.e. in the anolyte area, and which prevent the formation of an electrolytic short circuiting bridge between the electrodes by means of a droplet overflow.

In accordance with FIG. 2c, the outlet openings 24 are each connected with a runoff pipe 36 whose bottom is open to remove the emerging solution into a collecting channel 37 located below.

In order to use the cell for chromic acid regeneration, an ion exchange membrane is used to separate the anolyte space filled with chromic acid from the catholyte space filled with sulphuric acid. When the cell is used as an oxidation cell for methane sulphonic acid, a diaphragm is placed between anode and cathode.

Furthermore, it is possible to use electrodes with a carrier made from solution-resistant, electrically conducting plastic instead of electrodes with a carrier made from oxide ceramics.

The electrode frame is preferably made from solution-resistant plastic, such as PVDF or PP, which allows a maximum operating temperature of 140° C. The sealing element connected with the pressure application as well as the remaining sealing elements should preferably be made from silicone, however, it is also possible to use sealing elements made from polytetrafluoroethylene and/or Viton. Viton is the registered trademark of DuPont for copolymers of vinylidene flouride and hexaflouropropylene, which are synthetic rubbers. In this case, elasticity plays a major role in order to ensure impermeability when pressure is applied.

Figure 3:
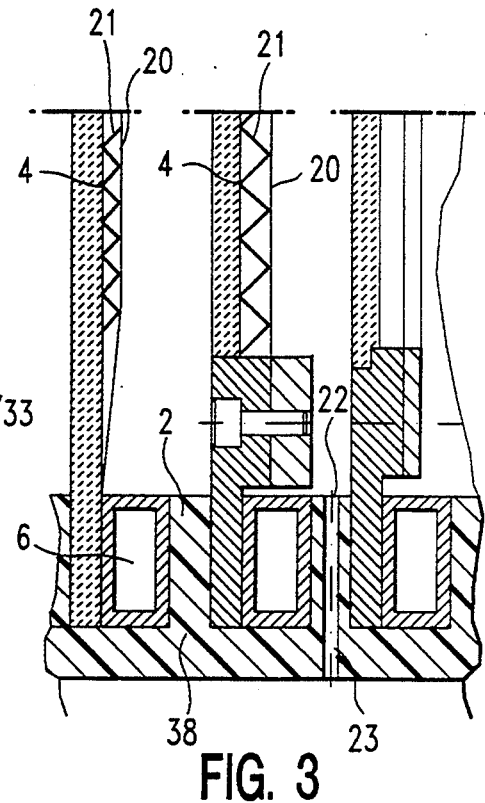
FIG. 3 is a detailed partial plan view of a cell with an electrode frame that is integrated into the cell trough.

FIG. 3 shows a section of electrode frame 2 as an integral component of a cell trough 1 which contains the electrodes and is also open at the top. According to FIG. 3, the electrode frames 2 are formed by means of parallel, U-shaped ribs that are spaced apart from each other and that run along the walls 38 of cell trough 1. This determines the exact spacing of the electrode frames and therefore screw bolts do not have to be used to adjust the distance. The compression and/or the sealing of the electrodes is achieved in this case by only applying pressure on the elastic sealing elements. The sealing elements preferably consist of a silicone hose which has a temperature stability of up to 80° C.

Even if the surface of the liquid is open at the top, a cover may be provided to cover the electrolyte and/or anolyte and catholyte spaces, if necessary with a gas exhaust, depending on the application.

The foregoing is exemplary and not intended to limit the scope of the claims which follow.

We claim:

1. Electrochemical cell for completion of electrochemical processes by means of ion conducting solutions, said cell comprising
   a plurality of plate-like electrodes, each electrode having at least one sealing surface,
   a plurality of electrode frames which hold said electrodes in parallel spaced apart relationship to form electrolyte spaces therebetween, each electrode frame having at least one sealing surface which faces a respective sealing surface of an electrode, and
   a plurality of hose-like tubular sealing elements, at least one said sealing element positioned against each sealing surface of an electrode and against the facing sealing surface of a frame, the sealing elements having a cross section which is expandable under pressure, whereby,
   a liquid impermeable seal can be formed between each pair of facing sealing surfaces by applying internal pressure to the tubular sealing element.

2. Cell in accordance with claim 1 further comprising a trough in which said frames are positioned in a fixed location.

3. Cell in accordance with claim 2 wherein said frames are formed integrally with said trough.

4. Cell in accordance with claim 3 wherein said frames comprise respective parallel ribs which form the respective sealing surfaces of said frames.

5. Cell in accordance with claim 1 wherein at least one sealing surface of each facing pair of sealing surfaces has a channel which receives a respective said sealing element therein in order to maintain said sealing element in a fixed position.

6. Cell in accordance with claim 5 wherein each said channel is formed in the sealing surface of an electrode frame.

7. Cell in accordance with claim 5 wherein each said channel is U-shaped in plan view.

8. Cell in accordance with claim 1 wherein each sealing element has an outer diameter between 2 mm and 6 mm and an inner diameter between 1 mm and 4 mm.

9. Cell in accordance with claim 1 wherein each sealing element has an internal pressure of 0.01 to 10 bar.

10. Cell in accordance with claim 1 wherein each tubular sealing element has one end which is closed.

11. Cell in accordance with claim 1 further comprising an additional said sealing element between each pair of frames, said additional sealing element being outside of said sealing element between said facing pair of sealing surfaces.

12. Cell in accordance with claim 1 wherein said sealing surfaces are U-shaped in plan view.

13. Cell in accordance with claim 1 wherein each frame is U-shaped and has a recess which receives a respective said electrode therein.

14. Cell in accordance with claim 13 wherein each recess is opposite from the sealing surface of the frame in which said recess is located.

15. Cell in accordance with claim 14 wherein each recess defines an additional sealing surface of said frame, each electrode having an additional sealing surface opposed from said at least one sealing surface of said electrode.

16. Cell in accordance with claim 13 wherein said cell has a top which is open, said recesses opening on said top, whereby said electrodes can be replaced from said top by reducing internal pressure in said sealing elements.

17. Cell in accordance with claim 1 wherein each frame is provided with an opening which serves as an overflow for the respective eletrolyte space.

18. Cell in accordance with claim 1 wherein each electrode is a bipolar electrode.

* * * * *